United States Patent
Allgaier et al.

(10) Patent No.: US 12,045,045 B2
(45) Date of Patent: Jul. 23, 2024

(54) RADAR MEASUREMENT APPARATUS WITH INTEGRATED SAFETY ZONE MONITORING

(71) Applicant: VEGA Grieshaber KG, Wolfach (DE)

(72) Inventors: Stefan Allgaier, Oberwolfach (DE);
Patrick Heizmann, Oberwolfach (DE);
Manfred Sum, Schenkenzell (DE);
Stefan Sum, Wolfach (DE)

(73) Assignee: VEGA Grieshaber KG, Wolfach (DE)

( * ) Notice: Subject to any disclaimer, the term of this patent is extended or adjusted under 35 U.S.C. 154(b) by 482 days.

(21) Appl. No.: 17/599,922

(22) PCT Filed: Mar. 30, 2020

(86) PCT No.: PCT/EP2020/058985
§ 371 (c)(1),
(2) Date: Sep. 29, 2021

(87) PCT Pub. No.: WO2020/201223
PCT Pub. Date: Oct. 8, 2020

(65) Prior Publication Data
US 2022/0197269 A1    Jun. 23, 2022

(30) Foreign Application Priority Data

Apr. 5, 2019   (DE) .................. 10 2019 204 881.1

(51) Int. Cl.
*G05B 19/41*   (2006.01)
*G01S 13/93*   (2020.01)
(Continued)

(52) U.S. Cl.
CPC ...... *G05B 19/41895* (2013.01); *G01S 13/931* (2013.01); *G05B 19/41885* (2013.01); *G05D 1/0094* (2013.01)

(58) Field of Classification Search
None
See application file for complete search history.

(56) References Cited

U.S. PATENT DOCUMENTS 10,254,145 B2   4/2019   Dieterle et al.
10,337,903 B2   7/2019   Welle et al.
(Continued)

FOREIGN PATENT DOCUMENTS

DE   10 2014 109 402 A1   1/2016
EP       2 803 952 A1   11/2014
(Continued)

OTHER PUBLICATIONS

Sommer et al., "Radar-based Situational Awareness for Industrial Safety Applications", Oct. 20, 2020, 2020 IEEE Sensors. (Year: 2020).*

(Continued)

*Primary Examiner* — Mohammad Ali
*Assistant Examiner* — Kelvin Booker
(74) *Attorney, Agent, or Firm* — Oblon, McClelland, Maier & Neustadt, L.L.P.

(57) ABSTRACT

A radar measuring device for process automation in an industrial environment with integrated safety area monitoring having a controller which is set up to adjust the direction of the radar transmission signal emitted in such a way that the safety area around the object is completely irradiated even if the object moves.

11 Claims, 3 Drawing Sheets

(51) Int. Cl.
*G01S 13/931* (2020.01)
*G05B 19/418* (2006.01)
*G05D 1/00* (2024.01)

(56) References Cited

U.S. PATENT DOCUMENTS

| | | | |
|---|---|---|---|
| 10,704,948 B2 | 7/2020 | Welle et al. | |
| 2005/0264438 A1* | 12/2005 | Fullerton | G01S 13/72 342/28 |
| 2006/0087385 A1* | 4/2006 | Fitzpatrick | G01S 13/0209 333/117 |
| 2006/0155398 A1* | 7/2006 | Hoffberg | G06V 40/103 700/86 |
| 2008/0143997 A1* | 6/2008 | Greenberg | G01B 11/0608 356/4.01 |
| 2013/0154875 A1* | 6/2013 | Sierwald | G01S 13/958 342/192 |
| 2013/0206837 A1* | 8/2013 | Szu | G06K 19/08 235/449 |
| 2015/0301338 A1* | 10/2015 | Van Heugten | G09G 3/32 345/8 |
| 2016/0018511 A1* | 1/2016 | Nayyar | G01S 13/931 342/27 |
| 2017/0123057 A1 | 5/2017 | Prinz et al. | |
| 2017/0219408 A1 | 8/2017 | Dieterle et al. | |
| 2017/0356787 A1 | 12/2017 | Welle et al. | |
| 2018/0106602 A1 | 4/2018 | Welle et al. | |
| 2018/0204345 A1* | 7/2018 | Motohashi | G06T 7/70 |
| 2019/0250246 A1* | 8/2019 | Murakami | H03D 7/00 |

FOREIGN PATENT DOCUMENTS

| | | | | |
|---|---|---|---|---|
| EP | 3 206 044 A1 | 8/2017 | | |
| EP | 3 258 296 A1 | 12/2017 | | |
| EP | 3252364 A1 * | 12/2017 | | F16P 3/147 |
| EP | 3 309 523 A1 | 4/2018 | | |
| WO | WO-0014479 A1 * | 3/2000 | | G01B 11/00 |
| WO | WO 2015/124201 A1 | 8/2015 | | |

OTHER PUBLICATIONS

Jamshidi et al., "Manufacturing and assembly automation by integrated metrology systems for aircraft wing fabrication", Jun. 2008, Proc. IMechE vol. 224 Part B: J. Engineering Manufacture. (Year: 2008).*
Sokovic et al., "Quality Improvement Methodologies—PDCA Cycle, RADAR Matrix, DMAIC and DFSS", Jul. 2010, Journal of Achievements in Materials and Manufacturing Engineering 43/1 (2010) 476-483. (Year: 2010).*
Kondratenko et al., "PLC Based System for Remote Liquids Level Control with Radar Sensor", Sep. 2015, The 8th IEEE International Conference on Intelligent Data Acquisition and Advanced Computing Systems: Technology and Applications. (Year: 2015).*
Dr.-Ing et al., "Optical short-range radar for level control measurement", Jun. 1984, IEE Proceedings, vol. 131, Pt. H, No. 3. (Year: 1984).*
Carmer et al., "Laser Radar in Robotics", Apr. 1995, Proceedings of the IEEE, vol. 84, No. 2, Feb. 1996. (Year: 1995).*
International Preliminary Report on Patentability issued Oct. 14, 2021 in PCT/EP2020/058985 (submitting English translation only), 6 pages.
German Office Action issued Mar. 10, 2020 in German Patent Application No. 102019204881.1, 7 pages.
International Search Report and Written Opinion issued Jun. 25, 2020 in PCT/EP2020/057292 (with English translation of Category of Cited Documents), 14 pages.
International Search Report mailed on Jul. 2, 2020 in PCT/EP2020/058985 filed on Mar. 30, 2020 (2 pages).

* cited by examiner

RADAR MEASUREMENT APPARATUS WITH INTEGRATED SAFETY ZONE MONITORING

REFERENCE TO RELATED APPLICATIONS

This application claims priority of German Patent Application No. 10 2019 204 881.1, filed Apr. 5, 2019, which is incorporated herein by reference in its entirety.

FIELD OF INVENTION

The invention relates to radar measuring technology. In particular, the invention relates to a radar measuring device, configured for process automation in an industrial environment and with integrated safety area monitoring, the use of such a radar measuring device for object monitoring on, for example, a conveyor belt, a method for process automation, such as building and factory automation, a program element and a computer-readable medium.

BACKGROUND

Radar measuring instruments can be used in process automation in industrial environments. Typical applications are level measurement, point level detection, height and volume measurements of filling/bulk materials and surface topology measurements.

Especially for bulk material monitoring, it can be advantageous to monitor a safety area around the filling/bulk material. This is done using safety area monitoring sensors.

SUMMARY

It is an object of the invention to provide efficient process automation in an industrial environment.

This object is solved by the subject-matter of the independent claims. Further embodiments of the invention result from the subclaims and the following description of embodiments.

A first aspect of the invention relates to a radar measuring device configured for process automation in an industrial environment with integrated safety area monitoring. The radar measuring device comprises a radar signal source arranged to generate and radiate a radar transmission signal in the direction of an object to be monitored, so that the object and also a safety area extending around the object are irradiated. An area outside the safety area is not to be irradiated, if possible.

An evaluation unit is provided which is set up to evaluate the radar transmission signal reflected by the object and the safety area and received by the radar measuring device. In addition, the radar measuring device has a controller, for example in the form of an electronic control circuit, possibly in combination with mechanical components, which is set up to adjust the direction of the radar transmission signal emitted in such a way that the safety area around the object and also when the object moves is completely irradiated, so that it can be fully monitored.

The security area may in particular be an area that is not to be entered by persons or other objects or, more generally, an area in which additional object detection or object motion detection is to be performed. The evaluation unit may be configured to be able to perform object detection or object motion detection in the security area.

An application example is the monitoring of a conveyor belt or a manufacturing robot. If the radar measuring device detects an object in the safety area, provision may be made to stop the conveyor belt or to stop or otherwise control the robot so that a collision does not occur.

The term "process automation in the industrial environment" can be understood as a subfield of technology that includes all measures for the operation of machines and plants without the involvement of humans. One goal of process automation is to automate the interaction of individual components of a factory plant in areas such as chemicals, food, pharmaceuticals, petroleum, paper, cement, shipping, or mining, etc. This field also includes building and factory automation.

A wide range of sensors can be used for this purpose, which are adapted in particular to the specific requirements of the process industry, such as mechanical stability, insensitivity to contamination, extreme temperatures and extreme pressures. Measured values from these sensors are usually transmitted to a control room, where process parameters such as level, limit level, flow, pressure or density can be monitored and settings for the entire plant can be changed manually or automatically.

One subarea of process automation in the industrial environment concerns logistics automation. With the help of distance and angle sensors, processes within a building or within an individual logistics facility are automated in the field of logistics automation. Typical applications include systems for logistics automation in the area of baggage and freight handling at airports, in the area of traffic monitoring (toll systems), in retail, parcel distribution or also in the area of building security (access control). Common to the examples listed above is that presence detection in combination with precise measurement of the size and position of an object is required by the respective application. Sensors based on optical measurement methods using lasers, LEDs, 2D cameras or 3D cameras that measure distances according to the time-of-flight (ToF) principle can be used for this purpose.

Another sub-area of process automation in the industrial environment concerns factory/production automation. Use cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the involvement of humans. The sensors used in this process and the specific requirements with regard to measuring accuracy when detecting the position and size of an object are comparable to those in the previous example of logistics automation. Therefore, sensors based on optical measuring methods are usually also used on a large scale in the field of factory automation.

According to one embodiment, the control system is set up to adjust the direction and also the aperture angle of the radar transmit signal so that the safety area around the object is completely irradiated even when the object is moving.

According to a further embodiment, the control system is set up to prevent an area outside the safety area from being irradiated by adjusting the direction and/or the aperture angle of the radar transmit signal. In this way, energy can be saved.

According to a further embodiment, the movement of the object comprises not only a translation, i.e. displacement of the object, but also an enlargement or reduction of the object. If the object is, for example, a bulk material, a filling of the bulk material stockpile or an emptying leads to a movement of the bulk material in the sense of the invention.

According to another embodiment, the object is an object on a conveyor belt, for example a consumer product, such as a bottle, or a component on a production line.

According to a further embodiment, the radar measuring device has a planar antenna with electronic and/or mechanical beam control for transmitting and receiving the radar transmission signal.

In particular, the radar measuring device can be set up as a level measuring device or point level sensor.

According to a further embodiment, the controller is set up to adjust the direction and/or the aperture angle of the radar transmit signal as a function of a speed of the object to be monitored. For example, it can be provided that the safety area increases if the object moves faster.

According to a further embodiment, the control system is set up to control a conveyor belt or a robot when an object is detected in the safety area.

According to another aspect, the use of a radar measuring device described above and below for object monitoring on a conveyor belt is disclosed. Further uses include: Collision monitoring around moving equipment such as cranes, robots, conveyor pipes, conveyor chutes, or autonomous free moving or guided units, and in and around stationary equipment such as silos, tanks, drop hoppers, etc.

Another aspect relates to a method for process automation in an industrial environment with safety area monitoring. First, a radar transmission signal is generated and radiated in the direction of an object to be monitored in such a way that the object and also a safety area extending around the object are irradiated. Then the radar transmission signal reflected by the object and the safety area and received by the radar measuring device is evaluated, whereupon the direction of the radar transmission signal emitted is adjusted in such a way that the safety area around the object is completely irradiated even if the object moves.

Another aspect relates to a program element that, when executed on a controller of a radar measurement device, instructs the radar measurement device to perform the method described above.

Another aspect relates to a computer-readable medium on which the program element described above is stored.

In the following, embodiments of the invention are described with reference to the figures. If the same reference signs are used in the following description of figures, these designate the same or similar elements. The illustrations in the figures are schematic and not to scale.

DETAILED DESCRIPTION OF EMBODIMENTS

Figure 1A:
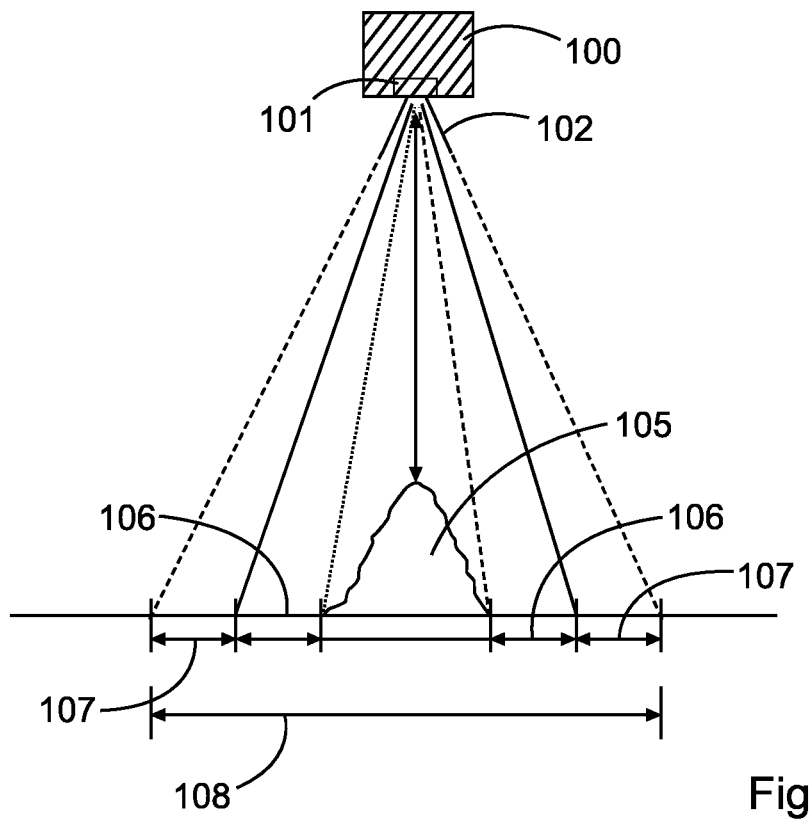
FIG. 1A shows a radar gauge in a bulk material application.

FIG. 1A shows a radar measurement device 100 according to one embodiment. The radar measurement device 100 has a radar signal source 101, 102. The radar signal source has electronics 101 that generate the radar transmission signal and an antenna 102 that radiates the radar transmission signal in the direction of the object 105 to be monitored, which is a bulk material.

The antenna 102 radiates the radar transmit signal in the direction of the bulk material 105, so that it irradiates not only the bulk cone, but also the safety area 106, which is located around the bulk cone 105. The area 107 lying outside the safety area 106 is not irradiated, since this does not appear to be necessary. Thus, the area 107 is a "blanked area" which, however, could be irradiated if the radar signal source were set differently, as indicated by the outer dashed lines and in case 108.

The radar measuring device 100 shown is, for example, a radar sensor with a planar antenna. If the expansion of the medium (bulk material) changes, the safety range is automatically adapted to the new expansion of the bulk material 105 under software control.

Figure 1B:
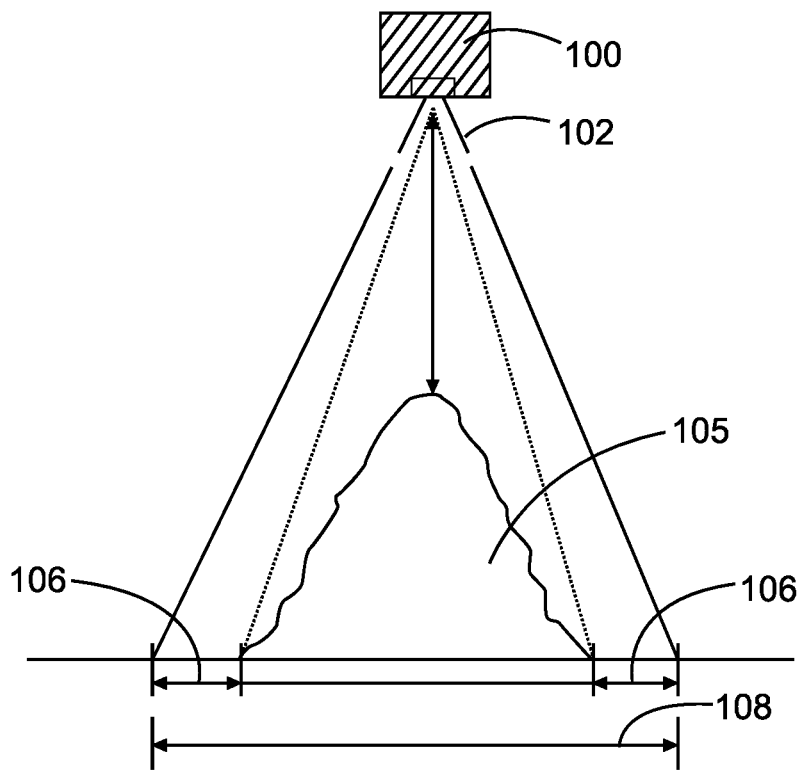
FIG. 1B shows the radar gauge of FIG. 1A in a bulk material application with a larger bulk material stockpile.

This is shown, for example, in FIG. 1B, in which it can be seen that the dump cone 105 has increased in size due to filling, and the safety area 106 around the dump cone has accordingly moved outward so that the entire monitoring area 108 is now irradiated.

Figure 2A:
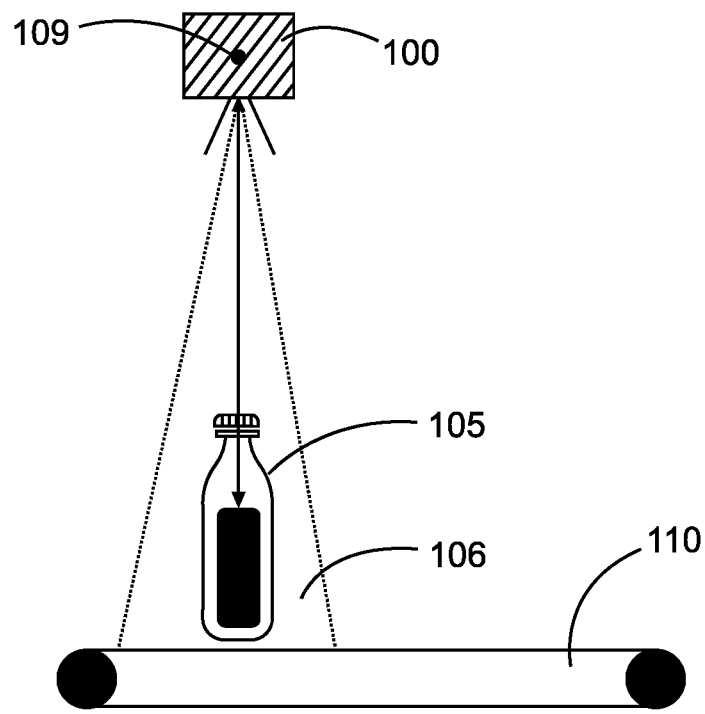
FIG. 2A shows a radar gauge in a conveyor belt application.

FIG. 2A shows a radar measuring device 100 with a pivotable planar antenna that can be rotated about the mechanical axis 109. In this embodiment, the radar measuring device 100 is set up for monitoring objects on a conveyor belt 110, for example. The objects are, for example, bottles, other consumer goods, or manufactured goods in a factory, an open field, or a warehouse.

Figure 2B:
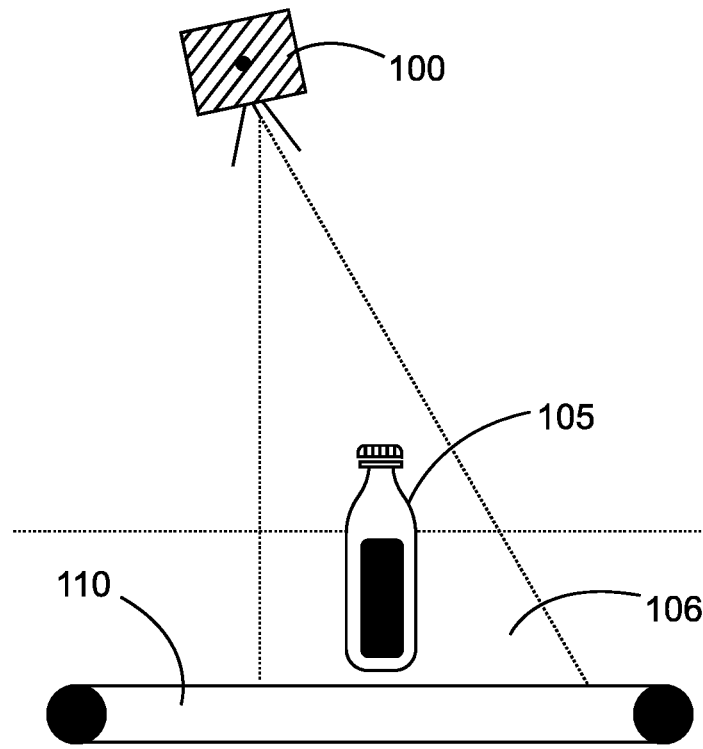
FIG. 2B shows the radar measuring device of FIG. 2A after a movement of the object.

If the position of the object 105 changes, the safety area is automatically tracked via the tilt of the radar gauge 100, as shown in FIG. 2B.

A combination of electronic beam control and mechanical beam control can also be provided.

Figure 3:
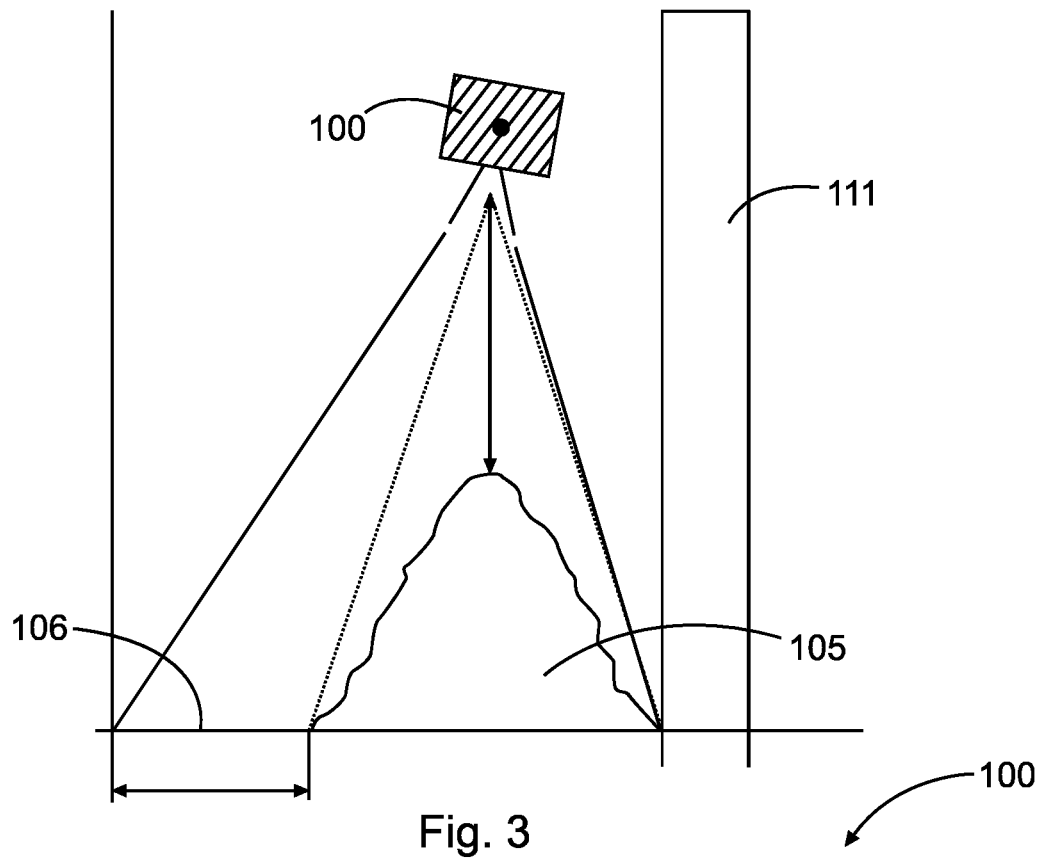
FIG. 3 shows a radar gauge in another bulk material application.

FIG. 3 shows another application in the field of bulk material measurement. If the extent of the bulk material 105 changes to the edge 111 of the monitoring area, the monitoring area can be automatically enlarged, for example, via the inclination of the radar measuring device 100, so that the irradiated monitoring area does not extend beyond the edge 111 (this is a wall, for example).

Figure 4:
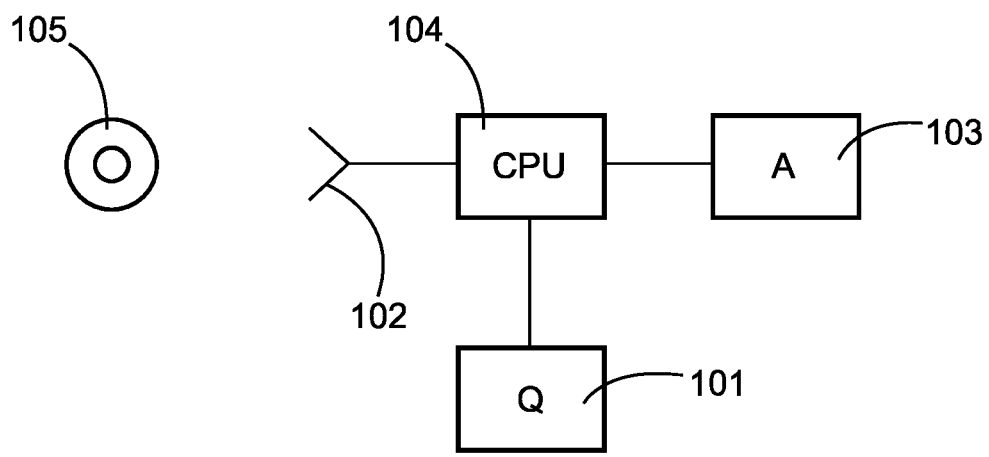
FIG. 4 shows components of a radar measuring device.

FIG. 4 shows a radar measuring device 100 according to one embodiment. The radar measuring device 100 has a controller 104, for example in the form of a control circuit (CPU), to which an evaluation unit 103 and a radar signal source 101 are connected. The radar transmission signal generated by the radar signal source 101 can be radiated via the antenna 102 in the direction of the object 105 to be monitored.

Figure 5:
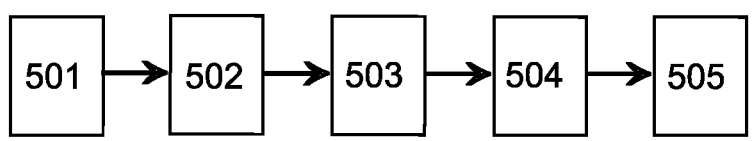
FIG. 5 shows a flow diagram of a process.

FIG. 5 shows a flow diagram of a method according to one embodiment. In step 501, a radar transmission signal is generated and emitted in step 502 in the direction of the object to be monitored. The reflected signal is received by the measuring device in step 503 and evaluated in step 504. Based on this evaluation, the direction and/or aperture angle of the radar transmission signal emitted are adjusted (step 505) in such a way that the safety area around the object to be monitored is completely irradiated, but an area beyond this is not irradiated.

Thus it is possible to monitor an object or to measure a filling level and at the same time to monitor the safety area around the object. The size of the safety area can be changed automatically depending on the condition (filling condition, position, speed) of the medium to be measured, so that a sufficient safety area (but preferably no area exceeding this)

is always irradiated around the medium to be measured, even if the medium is rapidly increasing, decreasing and/or moving.

Further safety range monitoring sensors are not necessary. The safety area automatically adapts to the expansion changes of the medium to be measured. The space required for the safety area is reduced to the minimum. The number of sources of error or disturbances to the process are reduced, allowing the process to run more smoothly and stably. With the aid of radar (for example 240 GHz transmission frequency) or ultrasound technology, the medium can be detected three-dimensionally and thus clearly demarcated from the safety area.

Supplementally, it should be noted that "comprising" and "having" do not exclude other elements or steps, and the indefinite articles "a" or "an" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A radar measuring device, configured for process automation in an industrial environment with integrated safety area monitoring, comprising:
   a radar signal source configured to generate and radiate a radar transmission signal toward an object to be monitored such that the object and also a security area extending around the object is irradiated;
   an evaluation circuit, configured to evaluate the radar transmission signal reflected by the object and the safety area and received by the radar measuring device; and
   a controller configured to adjust the direction of the radar transmission signal, such that the safety area around the object is completely irradiated even if the object is moving,
   wherein the controller is configured to adjust the direction and/or the aperture angle of the radar transmission signal in dependence on a speed of the object to be monitored.

2. The radar measuring device according to claim 1, wherein the controller is further configured to adjust the direction and an aperture angle of the radar transmission signal in such a way that the safety area around the object is completely irradiated even if the object is moving.

3. The radar measuring device according to claim 1, wherein the controller is further configured to prevent an area outside the safety area from being irradiated by adjusting the direction and/or the aperture angle of the radar transmission signal.

4. The radar measuring device according to claim 1, wherein movement of the object includes a translation, an enlargement, or a reduction of the object.

5. The radar measuring device according to claim 1, wherein the object is a filling material or a bulk material.

6. The radar measuring device according to claim 1, wherein the radar measurement device includes a planar antenna with electronic beam control for transmitting and receiving the radar transmission signal.

7. The radar measuring device according to claim 1, wherein the radar measurement device includes a pivotable planar antenna for mechanical beam steering for transmitting and receiving the radar transmission signal.

8. The radar measuring device according to claim 1, wherein the radar measuring device is embodied as a level measuring device or level limit sensor.

9. The radar measuring device according to claim 1, wherein the controller is configured to control a conveyor belt or a robot when an object is detected in the safety area.

10. A process automation method implemented in industrial environment with safety area monitoring, comprising:
    generating and radiating a radar transmission signal in a direction of an object to be monitored to irradiate the object along with a security area extending around the object;
    evaluating the radar transmission signal that is reflected from the object and the safety area and is received by the radar measuring device; and
    adjusting the direction of the radar transmission signal in such a way that the safety area around the object is completely irradiated even if the object is moving,
    wherein the controller is configured to adjust the direction and/or the aperture angle of the radar transmission signal in dependence on a speed of the object to be monitored.

11. A non-transitory computer readable medium having stored thereon a program element that, when executed on a controller of a radar measurement device, directs the radar measurement device to perform a process automation method implemented in industrial environment with safety area monitoring, comprising:
    generating and radiating a radar transmission signal in a direction of an object to be monitored to irradiate the object along with a security area extending around the object:
    evaluating the radar transmission signal that is reflected from the object and the safety area and is received by the radar measuring device; and
    adjusting the direction of the radar transmission signal in such a way that the safety area around the object is completely irradiated even if the object is moving,
    wherein the controller is configured to adjust the direction and/or the aperture angle of the radar transmission signal in dependence on a speed of the object to be monitored.

* * * * *